(12) United States Patent
Smith et al.

(10) Patent No.: US 12,576,794 B2
(45) Date of Patent: Mar. 17, 2026

(54) FLAG POLE MOUNT

(71) Applicants: Bryan Alan Smith, Mooresville, NC (US); Jeremy Wayne Clifton, Statesville, NC (US)

(72) Inventors: Bryan Alan Smith, Mooresville, NC (US); Jeremy Wayne Clifton, Statesville, NC (US)

( * ) Notice: Subject to any disclaimer, the term of this patent is extended or adjusted under 35 U.S.C. 154(b) by 77 days.

(21) Appl. No.: 18/484,555

(22) Filed: Oct. 11, 2023

(65) Prior Publication Data

US 2024/0116455 A1 Apr. 11, 2024

Related U.S. Application Data

(60) Provisional application No. 63/379,022, filed on Oct. 11, 2022.

(51) Int. Cl.
B60R 11/00 (2006.01)
B62D 63/08 (2006.01)

(52) U.S. Cl.
CPC ......... B60R 11/00 (2013.01); B60R 2011/004 (2013.01); B60R 2011/0059 (2013.01); B62D 63/08 (2013.01)

(58) Field of Classification Search
CPC .............. B60R 11/00; B60R 2011/004; B60R 2011/0059; B62D 63/08
USPC ........................................................ 248/541
See application file for complete search history.

(56) References Cited

U.S. PATENT DOCUMENTS

| | | | | |
|---|---|---|---|---|
| 6,273,448 | B1 * | 8/2001 | Cross ...................... | B60D 1/36 |
| | | | | 280/477 |
| 6,557,483 | B2 * | 5/2003 | Nathan .................... | B60D 1/36 |
| | | | | 116/28 R |
| 6,637,718 | B2 * | 10/2003 | Wilson .................... | G09F 21/04 |
| | | | | 248/539 |
| D584,363 | S * | 1/2009 | Gordon ........................ | D12/400 |
| 7,762,529 | B1 * | 7/2010 | Scott ........................ | B60D 1/06 |
| | | | | 280/441.2 |
| 8,915,515 | B1 * | 12/2014 | Riibe ..................... | B60D 1/065 |
| | | | | 280/507 |
| 2003/0071185 | A1 * | 4/2003 | Casapulla .............. | A01K 97/10 |
| | | | | 248/534 |
| 2006/0156600 | A1 * | 7/2006 | Barker .................... | G09F 17/00 |
| | | | | 40/591 |

* cited by examiner

*Primary Examiner* — Anita M King
(74) *Attorney, Agent, or Firm* — James David Johnson; Johnson & Martin, P.A.

(57) ABSTRACT

A mount device for receiving a flag pole is described. The mount device is attachable to a trailer hitch such as a gooseneck hitch or a fifth wheel hitch, which is installed on a vehicle. The mount device includes a connecting tube for inserting into a hitch ball receiving aperture of the trailer hitch. The connecting tube has a top end defining a top aperture. The mount device also includes a receiving tube for inserting into the connecting tube. The receiving tube has a top end defining a top aperture for receiving a flag pole by inserting the flag pole into the aperture of the receiving tube.

12 Claims, 8 Drawing Sheets

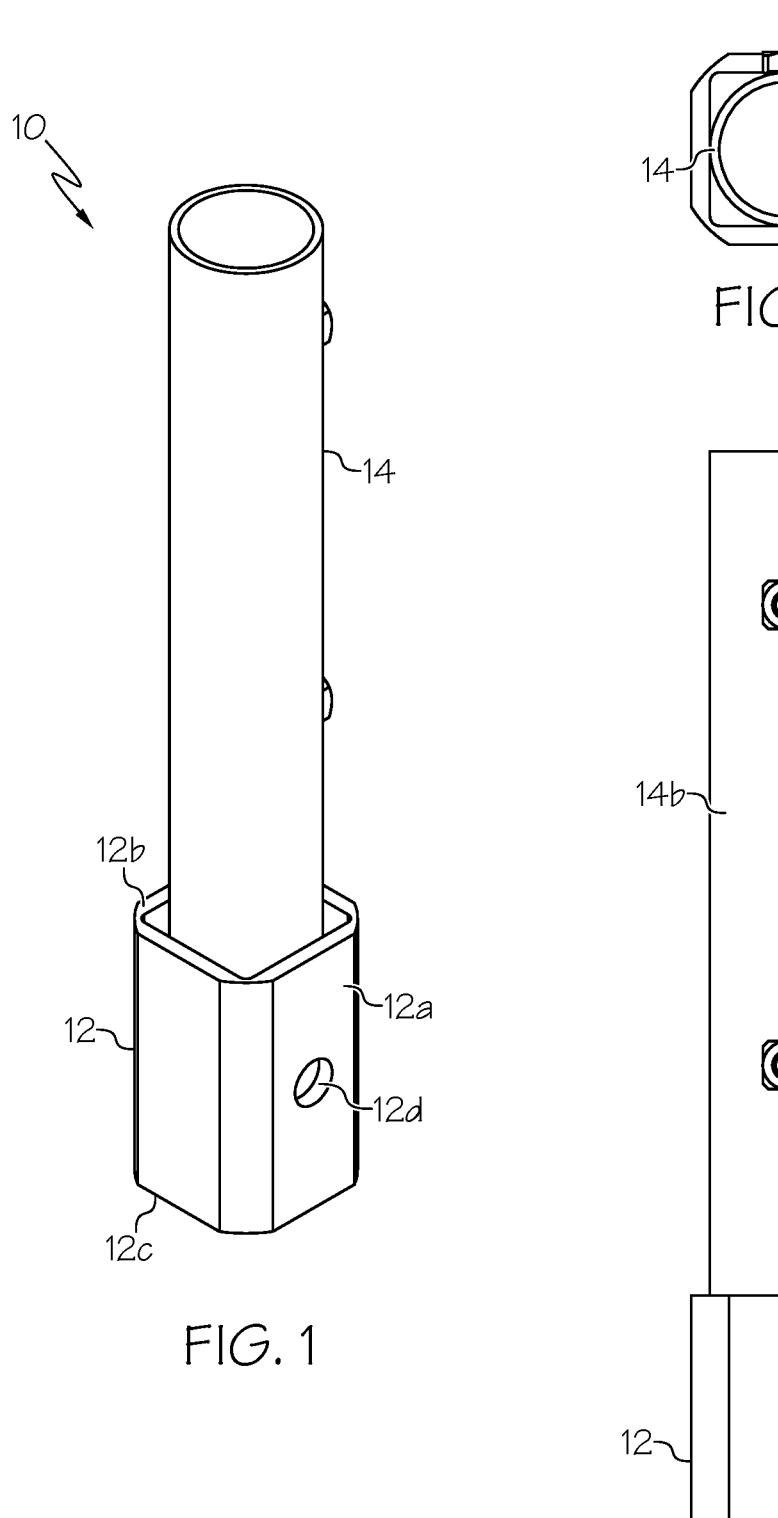
FIG. 1
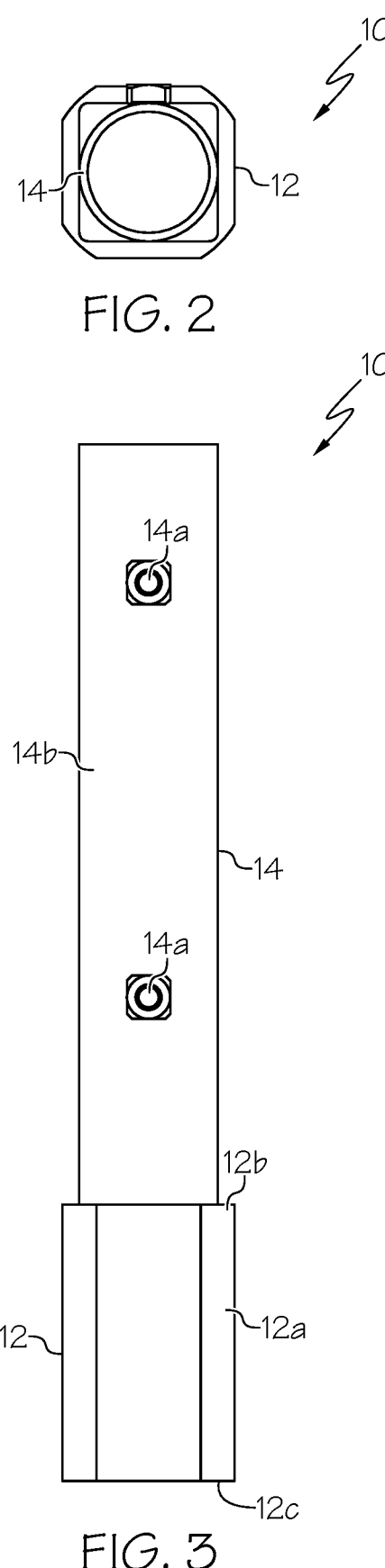
FIG. 2
FIG. 3

FLAG POLE MOUNT

CROSS-REFERENCE TO RELATED APPLICATIONS

This application is a nonprovisional application of and claims priority from U.S. provisional patent application Ser. No. 63/379,022 filed on Oct. 11, 2022. The foregoing application is incorporated in their entirety herein by reference

FIELD OF THE INVENTION

The invention relates to attachment devices. More particularly, the invention relates to mount devices, systems, and methods for attaching a flag pole to a vehicle.

BACKGROUND

Mounting a flag pole to an automobile, tractor, recreational vehicle, or other vehicle has become a popular manner of displaying a flag in support of or to affiliate a user with a sport team, political party, university, college, school, organization, geographic location, or other cause. Mounting devices have been developed to attach flag poles to trailer hitches, and primarily to rear-mounted and bumper-mounted trailer hitches. Flag pole mount devices for use with gooseneck trailer hitches and fifth wheel trailer hitches are not available in the market.

A need exists for flag pole mounting devices, systems, and methods that allow a flag pole to be securely attached to a vehicle by installation on or to a gooseneck trailer hitch or a fifth wheel trailer hitch.

SUMMARY

The invention relates to mount devices, systems, and methods for receiving a flag pole and securing the flag pole to a vehicle. The flag pole mount device may also be referred to herein as a mount, a flag pole mount, a mounting device, and a flag pole mounting device. The mount device is attachable to a trailer hitch such as a gooseneck hitch or a fifth wheel hitch, which is installed on a vehicle.

In one embodiment, the mount device includes a connecting tube for inserting into a hitch ball receiving aperture of the trailer hitch. The connecting tube has a top end defining a top aperture. The mount device also includes a receiving tube for inserting into the connecting tube. The receiving tube has a top end defining a top aperture for receiving a flag pole by inserting the flag pole into the aperture of the receiving tube.

In another embodiment, flag pole mount device includes a lower attachment device for connecting to a gooseneck trailer hitch and an upper attachment device for connecting to the lower attachment device and for receiving and holding a flag pole. The lower attachment device is removably connectable to the trailer hitch and includes a lower wedge lock and a center bolt. The lower wedge lock of the lower attachment device is attached at its bottom end to the trailer hitch so that the center bolt extends vertically above and from a center of the lower wedge lock. The upper attachment device is removably connectable to the lower attachment device. The upper attachment device includes an upper wedge lock, a plate that covers a top end of the upper wedge lock, a gusset connected to an upper side of the plate, a vertical mount cap that connects to the upper side of the plate, and a mount head that is removably connectable to the vertical mount cap. The bottom end of the upper wedge lock can be aligned with and connected to the top end of the lower wedge lock so that, once connected, the upper wedge lock and lower wedge lock form one cylindrical body. The upper and lower wedge locks may be tightened together by twisting, which creates friction between them that prevents the flag pole mount device from being removed or detached from the trailer hitch without loosening the wedge locks.

The flag pole mount devices, systems, and methods described herein provide an advantage by permitting a flag pole to be mounted securely but removably to a vehicle by connection of a mount device to a gooseneck trailer hitch or a fifth wheel trailer hitch installed on the vehicle.

Accordingly, the invention features a mount device for receiving a flag pole. The mount device includes a connecting tube and a receiving tube. The connecting tube includes a bottom end for inserting into a hitch ball receiving aperture of a trailer hitch on a vehicle. The connecting tube also includes a top end defining a top aperture. The receiving tube includes one or more side walls and a bottom end for inserting into the top aperture of the connecting tube. The receiving tube also includes a top end defining a top aperture for receiving a flag pole by insertion into an interior space defined by the one or more side walls of the receiving tube.

In another aspect, the invention can feature the trailer hitch being a gooseneck hitch or a fifth wheel hitch.

In another aspect, the invention can feature the receiving tube including at least one aperture for receiving a fastener that, when inserted through the aperture from an exterior side wall of the receiving tube, contacts the flag pole inserted inside the interior space of the receiving tube so as to secure the flag pole within the receiving tube.

In another aspect, the invention can feature the connecting tube being square in horizontal cross-section and the receiving tube being circular in horizontal cross-section. The interior space defined by the one or more walls of the receiving tube is cylindrical for receiving the flag pole.

In another aspect, the invention can feature the receiving tube including at least two side apertures through one wall of its one or more side walls, wherein the at least two side apertures are vertically aligned with one another. Each of the at least two side apertures includes a weld nut installed therein for receiving handle screws, hand knob screws, or other fasteners that are insertable into each weld nut to fasten the flag pole inside the interior space of the receiving tube.

The invention also features a system for attaching a flag to a vehicle. The system includes a connecting tube, a receiving tube, and a flag pole. The connecting tube includes a bottom end for inserting into a hitch ball receiving aperture of a trailer hitch on a vehicle. The connecting tube also includes a top end defining a top aperture. The receiving tube includes a bottom end for inserting into the top aperture of the connecting tube. The receiving tube also includes a top end defining a top aperture. The flag pole includes a bottom end that is insertable into the top aperture of the receiving tube and a top end to which a flag is attachable.

The invention also features a system for attaching a flag pole to a vehicle. The system includes a lower attachment device for connecting to a trailer hitch and an upper attachment device for connecting to the lower attachment device and for receiving and holding a flag pole.

In another aspect, the invention can feature the trailer hitch being a gooseneck trailer hitch.

In another aspect, the invention can feature the lower attachment device including a lower wedge lock and a center bolt. The lower wedge lock includes a side wall, a top end, and a bottom end. The bottom end of the lower wedge lock is removably connectable to the trailer hitch. The center bolt is connected to and extends vertically above and from a center of the top end of the lower wedge lock.

In another aspect, the invention can feature the top end of the lower wedge lock including a shape that is elliptical in a diagonal plane and wherein the bottom end is generally flat.

In another aspect, the invention can feature the upper attachment device including an upper wedge lock, a plate, a gusset, a vertical mount cap, and a mount head. The upper wedge lock includes a side wall, a top end, and a bottom end. The plate includes an upper side and a lower side, wherein the plate covers the top end of the upper wedge lock. The gusset is connected to the upper side of the plate. The vertical mount cap connects to the upper side of the plate. The mount head is connectable to the vertical mount cap.

In another aspect, the invention can feature the upper attachment device including an upper wedge lock having a side wall, a top end, and a bottom end. The top end of the upper wedge lock is generally flat, and the bottom end has a shape that is elliptical in a diagonal plane.

In another aspect, the invention can feature the shapes of the top end of the lower wedge lock and the bottom end of the upper wedge lock being complementary so as to be alignable with and connectable to one another. Once connected, the upper wedge lock and lower wedge lock form a unitary cylindrical body.

In another aspect, the invention can feature the upper and lower wedge locks being connectable together by twisting to lock them together to prevent the system from being removed or detached from the trailer hitch during usage of the system for attaching a flag pole to a vehicle.

In another aspect, the invention can feature the plate including a first aperture that passes vertically through the plate for receiving a bottom end of the gusset and a second aperture that passes vertically through the plate for receiving a bottom end of the vertical mount cap.

In another aspect, the invention can feature the gusset being oriented vertically when installed and providing strength and stability to the mount head when the mount head is attached to the vertical mount cap.

In another aspect, the invention can feature the vertical mount cap being plate-shaped and being vertically oriented when connected to the plate and to the mount head.

In another aspect, the invention can feature the vertical mount cap including two or more apertures for receiving handle screws, hand knob screws, or other fasteners.

In another aspect, the invention can feature the mount head including three side walls forming a channel therebetween. The channel is generally U-shaped, rectangular, trapezoidal, or semicircular. The mount head is vertically oriented when connected to the vertical mount cap.

In another aspect, the invention can feature that, when the mount head is connected to the vertical mount cap, the channel of the mount head is enclosed by the vertical mount cap thereby forming an interior space between the mount head and the vertical mount cap. A flag pole is insertable into the interior space.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 1 is a perspective view of a first embodiment of a flag pole mount device.

FIG. 2 is a top plan view of the flag pole mount device of FIG. 1.

FIG. 3 is a front elevation view of the flag pole mount device of FIG. 1.

DETAILED DESCRIPTION

Figures 4, 5:
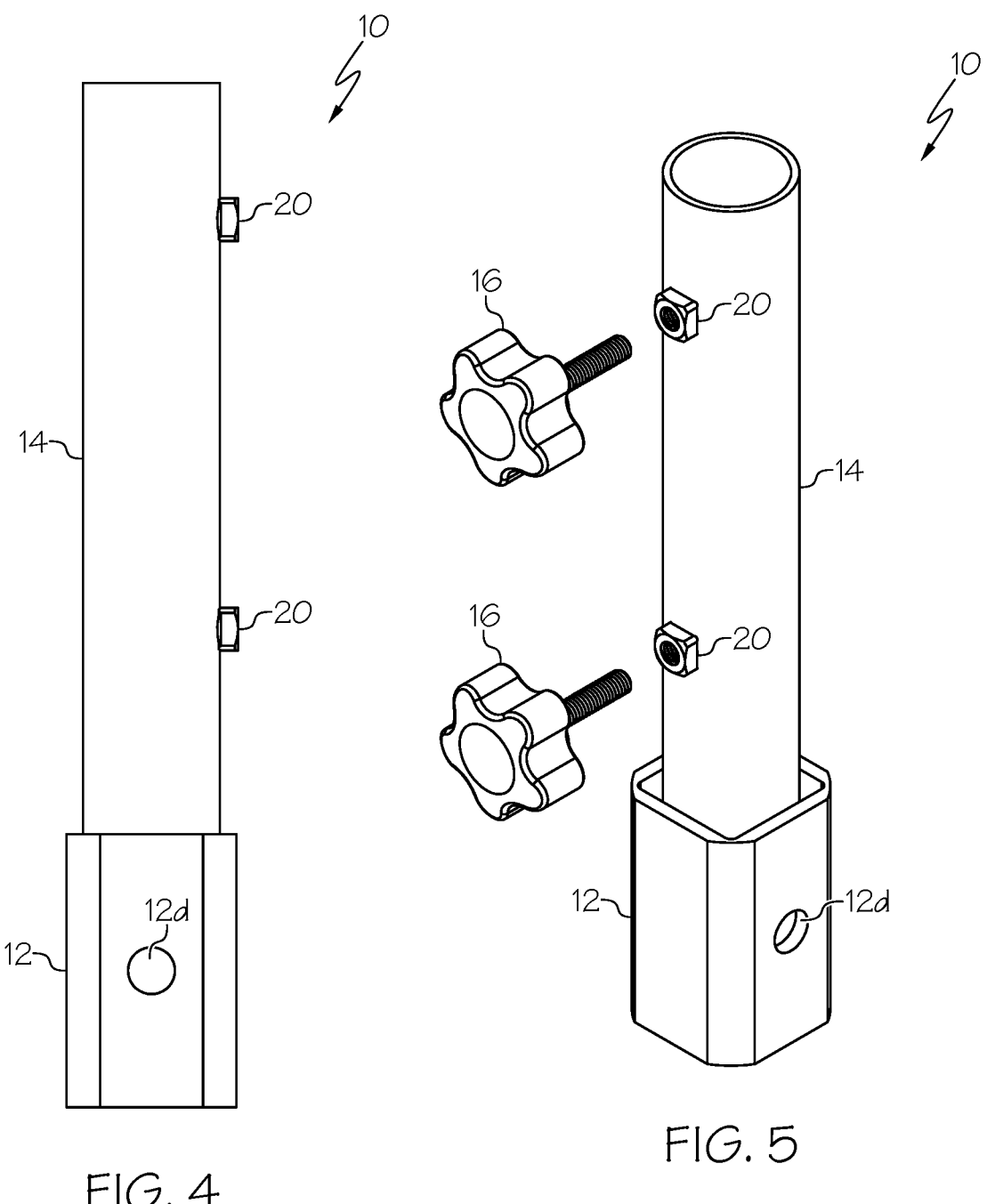
FIG. 4 is a left side elevation view of the flag pole mount device of FIG. 1.
FIG. 5 is an exploded perspective view of the flag pole mount device of FIG. 1 with hand knob screws.
Figure 6:
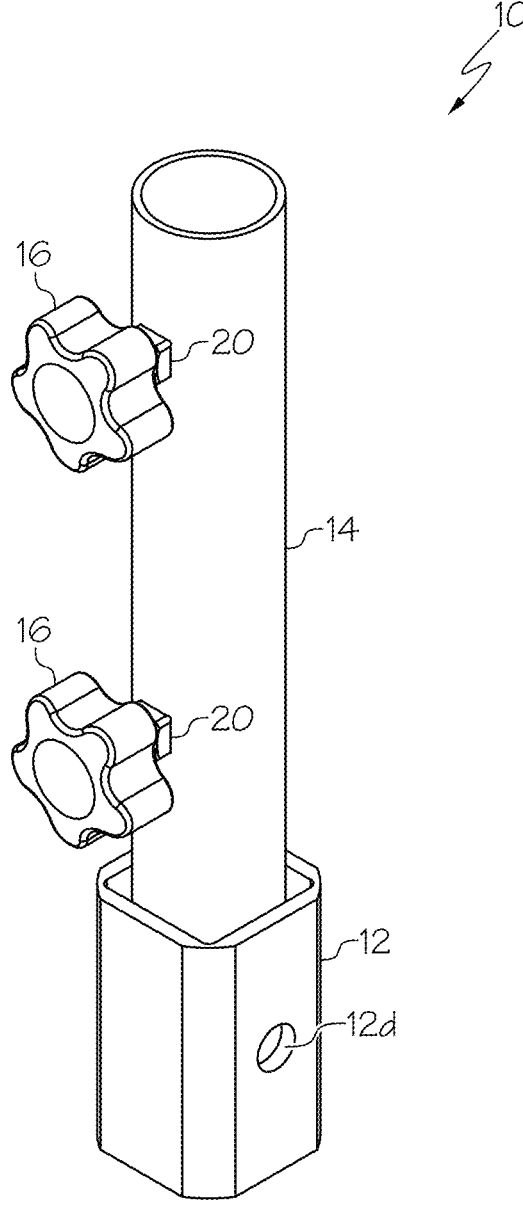
FIG. 6 is a perspective view of the flag pole mount device of FIG. 5 with hand knob screws installed.
Figures 7, 8, 9:
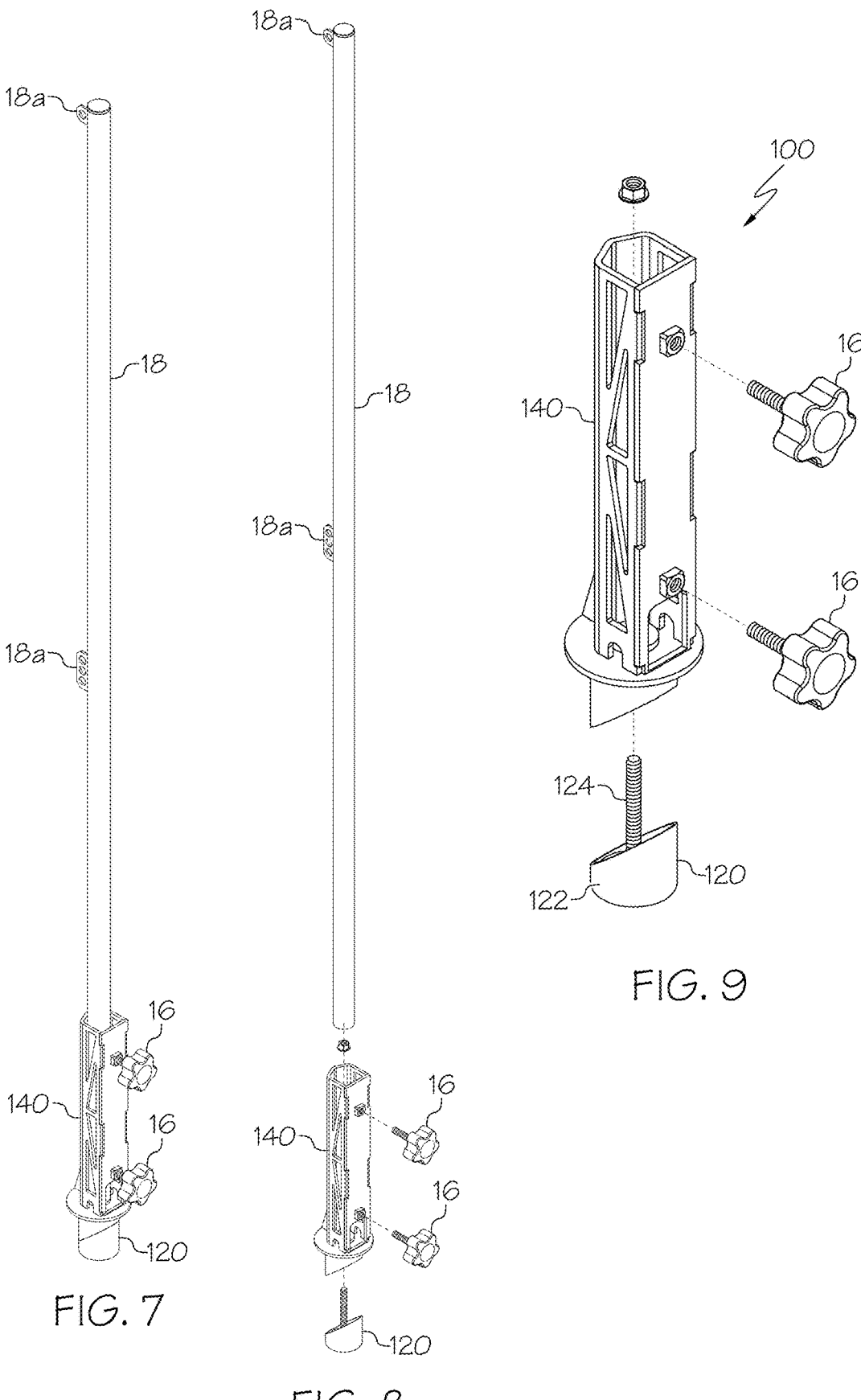
FIG. 7 is a perspective view of a second embodiment of a flag pole mount device with a flag pole attached thereto.
FIG. 8 is an exploded perspective view of the flag pole mount device and flag pole of FIG. 7.
FIG. 9 is an exploded perspective view of the flag pole mount device of FIG. 7.
Figure 10:
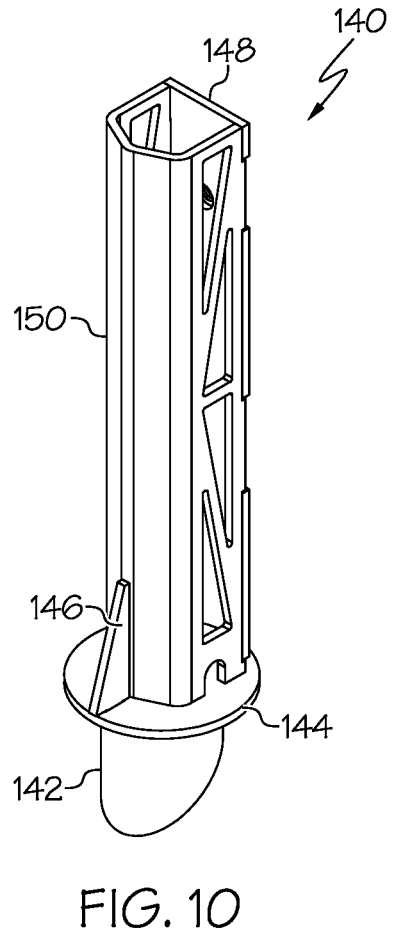
FIG. 10 is a perspective view of an upper portion of the flag pole mount device of FIG. 7.
Figure 11:
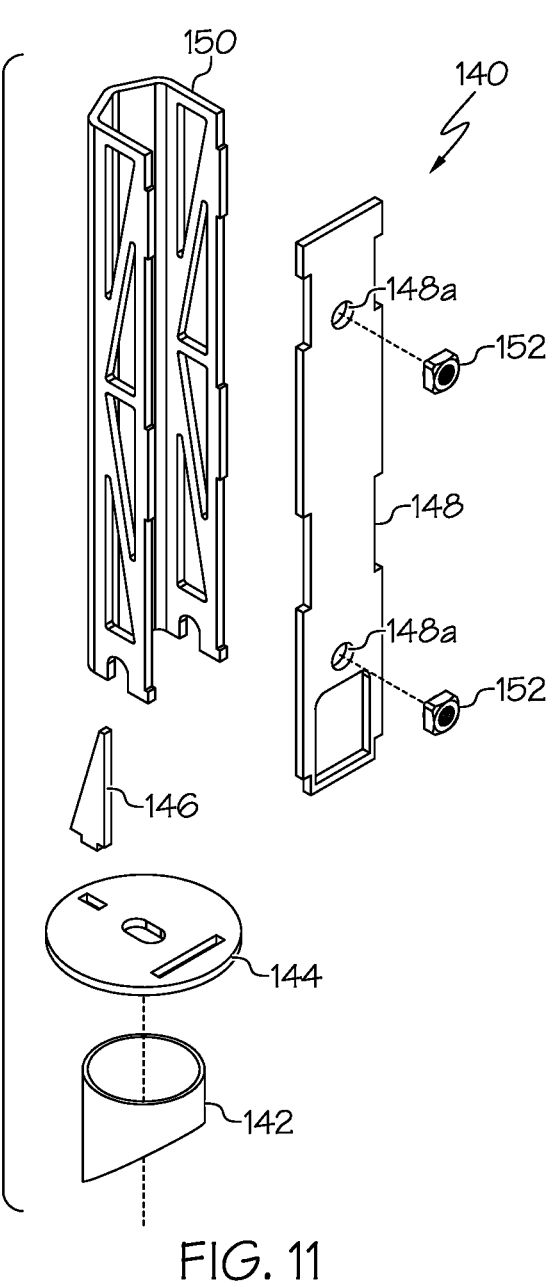
FIG. 11 is another exploded perspective view of the flag pole mount device of FIG. 7.
Figure 12:
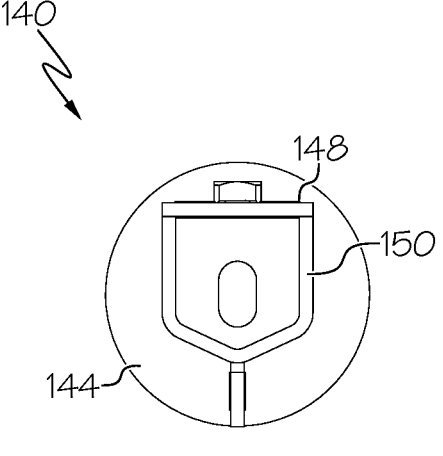
FIG. 12 is a top plan view of the flag pole mount device of FIG. 7.
Figure 13:
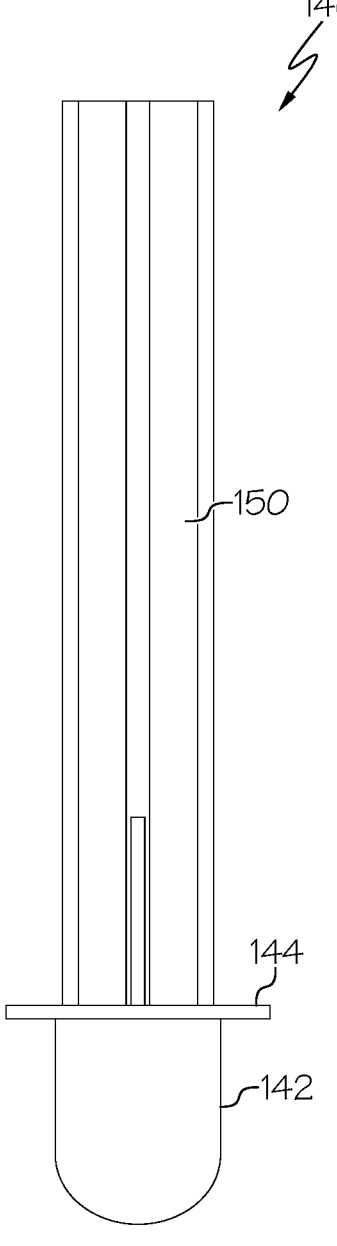
FIG. 13 is a rear elevation view of the flag pole mount device of FIG. 7.
Figure 14:
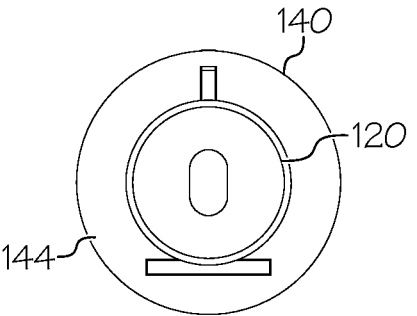
FIG. 14 is a bottom plan view of the flag pole mount device of FIG. 7.
Figures 15, 16:
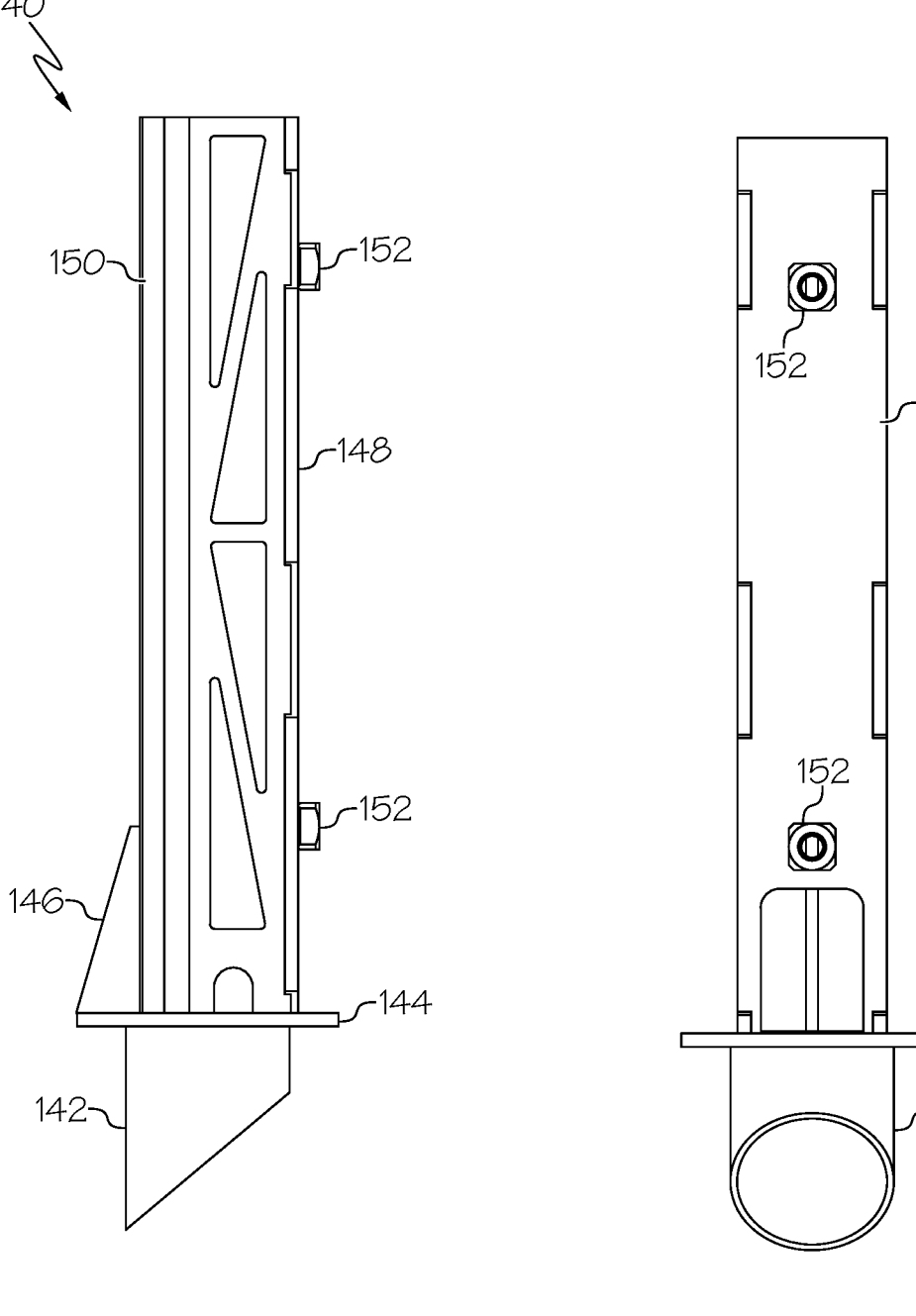
FIG. 15 is a left side elevation view of the flag pole mount device of FIG. 7.
FIG. 16 is a front elevation view of the flag pole mount device of FIG. 7.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof, and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides a mount device for receiving a flag pole. The mount device is attachable to a trailer hitch that is installed on a vehicle. In exemplary embodiments, the mount device is attached to a gooseneck trailer hitch or to a fifth wheel trailer hitch. The mount device receives a flag pole so that a flag may be displayed (or flown) when the vehicle is stationary or in motion.

Embodiment 1

In one exemplary embodiment of a mount device 10 for receiving a flag pole shown in FIGS. 1-6, the mount device 10 includes a connecting tube 12 and a receiving tube 14. The mount device 10 may also include one or more fasteners 16 to securely attach the connecting tube 12 to the trailer hitch. The mount device 10 may also include one or more fasteners 16 to securely attach a flag pole 18 and receiving tube 14 or to hold the flag pole in a generally fixed position when installed in the receiving tube.

The connecting tube 12 is insertable into a hitch ball receiving aperture of the trailer hitch. The connecting tube 12 includes one or more side walls 12a defining an interior space, a top end 12b defining a top aperture, and a bottom end 12c that is insertable into the hitch ball receiving aperture. The connecting tube 12 can be square, rectangular, circular, elliptical, triangular, or any other shape in horizontal cross-section. The connecting tube 12 may be produced in a cross-sectional shape that corresponds to a shape of the hitch ball receiving aperture of the trailer hitch into which the connecting tube is being inserted. The hitch ball receiving aperture of most trailer hitches is square or circular in shape.

The receiving tube 14 is insertable into the connecting tube 12. The receiving tube 14 includes one or more side walls defining an interior space, a top end defining a top aperture, and a bottom end. The top aperture of the receiving tube 14 is shaped and sized to receive a flag pole 18 by insertion of a bottom end of the flag pole therethrough so that the flag pole extends downward into the interior space of the receiving tube. The receiving tube 14 can be square, rectangular, circular, elliptical, triangular, or any other shape in horizontal cross-section. In some embodiments, the receiving tube 14 has a cross-sectional shape that corresponds to a shape of the top aperture of the connecting tube 12 into which the receiving tube is being inserted. For example, the receiving tube 14 and the top aperture of the connecting tube 12 may both be square in shape or may both be circular in shape. In other embodiments, the receiving tube 14 has a cross-sectional shape that differs from the shape of the top aperture of the connecting tube 12 into which the receiving tube is being inserted. For example, the receiving tube 14 may be circular in horizontal cross-section while the top aperture of the connecting tube 12 is circular in shape, or vice versa.

In some embodiments, the connecting tube 12 includes one or more side apertures 12*d* through at least one of its one or more side walls 12*a*. For example, the connecting tube 12 may include one, two, three, or more side apertures 12*d*. The side apertures 12*d* of the connecting tube 12 may be vertically or horizontally aligned with one another, or some may be vertically aligned while others are horizontally aligned. All of the side apertures 12*d* may be on the same side wall of the connecting tube 12 (or on the same side of the side wall in the case of a connecting tube that is circular or elliptical in horizontal cross-section), or the side apertures may be formed in different side walls (or on different sides of the side wall, again, in the case of a connecting tube that is circular or elliptical in horizontal cross-section). In some of these embodiments, a weld nut is installed each (or some) of the one or more side apertures of the connecting tube 12 so as to be capable of receiving a fastener 16. A fastener 16 may be inserted or otherwise installed in and through at least one of the one or more side apertures of the connecting tube. Examples of fasteners 16 may be used include screws, bolts, pins, handle screws, hand knob screws, or any other suitable fastener. When the fastener 16 is inserted or installed in or through a side aperture 12*d* of the connecting tube 12, the receiving tube 14 is secured in a fixed position within the interior space of the connecting tube. For example, in some embodiments, the receiving tube 14 may include a side aperture that aligns vertically with the side aperture of the connecting tube 12 so that, when the fastener 16 is inserted into the side aperture of the connecting tube, the fastener also extends into and through the aligned side aperture of the receiving tube. In other examples in which the receiving tube does not include a corresponding side aperture that vertically aligns with the side aperture of the connecting tube, the fastener presses against or otherwise makes frictional contact with an exterior surface of the receiving tube's side aperture when the fastener is inserted into and through the connecting tube's side aperture.

In some embodiments, the receiving tube 14 includes one or more side apertures 14*a* through at least one of its one or more side walls 14*b*. For example, the receiving tube 14 may include one, two, three, or more side apertures 14*b*. The side apertures 14*a* of the receiving tube 14 may be vertically or horizontally aligned with one another, or some may be vertically aligned while others are horizontally aligned. All of the side apertures 14*a* may be on the same side wall 14*b* of the receiving tube 14 (or on the same side of the side wall in the case of a receiving tube that is circular or elliptical in horizontal cross-section), or the side apertures may be formed in different side walls (or on different sides of the side wall, again, in the case of a receiving tube that is circular or elliptical in horizontal cross-section). In some of these embodiments, a weld nut 20 is installed each (or some) of the one or more side apertures 14*a* of the receiving tube 14 so as to be capable of receiving a fastener 16. A fastener 16 may be inserted or otherwise installed in and through at least one of the one or more side apertures 14*a* of the receiving tube 14. Examples of fasteners 16 that may be used include screws, bolts, pins, handle screws, hand knob screws, or any other suitable fastener. When the fastener 16 is inserted or installed in or through a side aperture 14*a* of the receiving tube 14, the fastener presses against or otherwise makes frictional contact with the flag pole 18 so that the flag pole is secured in a fixed position within the interior space of the receiving tube. In exemplary embodiments, the side apertures 14*a* of the receiving tube 14 include weld nuts 20 into which the hand knob screws or handle screws are insertable by screwing to press into the flag pole 18 installed inside the interior space of the receiving tube.

In one exemplary embodiment, the mount device 10 includes a connecting tube 12 that is square in horizontal cross-section and a receiving tube 14 that is circular in horizontal cross-section. A top aperture of the connecting tube 12 is sized and shaped to receive a bottom end of the receiving tube 14, which is inserted into the top aperture of the connecting tube. A top aperture of the receiving tube 14 is sized and shaped to receive a bottom end of a flag pole 18, which is inserted into the top aperture of the receiving tube. One or more side walls 14*b* of the receiving tube 14 define an interior space that is cylindrical for receiving the flag pole 18, which also is cylindrical. The receiving tube 14 includes two side apertures 14*a* through its side wall 14*b*, which are vertically aligned with one another, and each of the side apertures has a weld nut 20 installed therein. Handle screws or hand knob screws 16 are insertable into each weld nut 20 to fasten the flag pole 18 inside the interior space of the receiving tube 14.

The invention also relates to a system that includes the mount device 10 and the flag pole 18. The invention also relates to methods for connecting a flag pole to a vehicle using the mount device as described herein in its various embodiments.

Embodiment 2

In another exemplary embodiment of a mount device 100 for receiving a flag pole 18 shown in FIGS. 7-16, the invention relates to a flag pole mount device 100 having a lower attachment device 120 for connecting to a gooseneck trailer hitch and an upper attachment device 140 for connecting to the lower attachment device and for receiving and holding a flag pole.

The lower attachment device 120 is removably connectable to the trailer hitch and includes a lower wedge lock 122 and a center bolt 124. The lower wedge lock 122 of the lower attachment device 120 has a cylindrical side wall, a flat bottom end, and a top end that is elliptical as if a whole cylinder is cut at an oblique plane with a portion above the cut removed. The lower wedge lock 122 of the lower attachment device 120 is attached at its bottom end to the trailer hitch so that the center bolt 124 extends vertically above and from a center of the lower wedge lock.

The upper attachment device 140 is removably connectable to the lower attachment device 120. The upper attachment device 140 includes an upper wedge lock 142, a plate 144 that covers a top end of the upper wedge lock, a gusset 146 connected to an upper side of the plate, a vertical mount cap 148 that connects to the upper side of the plate, and a mount head 150 that is removably connectable to the vertical mount cap. The upper wedge lock 142 of the upper attachment device 140 has a cylindrical side wall, a flat top end, and a bottom end that is elliptical as if a whole cylinder is cut at an oblique plane with a portion below the cut removed. The bottom end of the upper wedge lock 142 can be aligned with and connected to the top end of the lower wedge lock 122 so that, once connected, the upper wedge lock and lower wedge lock form one cylindrical body. The upper and lower wedge locks 142, 122 may be tightened together by twisting, which creates friction between them that prevents the flag pole mount device 100 from being removed or detached from the trailer hitch without loosening the wedge locks.

The plate 144 is attached to the top end of the upper wedge lock 142. The plate 144 includes a first aperture that passes vertically through the plate for receiving a bottom end of the gusset 146. The plate 144 includes a second aperture that passes vertically through the plate for receiving a bottom end of the vertical mount cap 148. The gusset 146 is oriented vertically when installed and provides strength and stability to the mount head 150 when the mount head is attached to the vertical mount cap 148.

The vertical mount cap 148 is shaped as a plate that is vertically oriented when connected to the plate 144 and to the mount head 150. The vertical mount cap 148 includes two or more apertures 148a for receiving fasteners 16. In some embodiments, the apertures 148a may each have weld nuts 152 installed in them for receiving handle screws, hand knob screws, or other fasteners 16.

The mount head 150 includes three side walls forming a channel therebetween. The channel is generally U-shaped in exemplary embodiments but may have over cross-sectional shapes in other embodiments such as, for example, rectangular, trapezoidal, or semicircular. The mount head 150 is vertically oriented when connected to the vertical mount cap 148. When the mount head 150 is connected to the vertical mount cap 148, the channel of the mount head is enclosed by the vertical mount cap thereby forming an interior space between them. The flag pole 18 is insertable into this interior space.

Fasteners 16 are inserted through each of the apertures 148a of the vertical mount cap 148 or weld nuts 152. Examples of fasteners 16 that may be used include screws, bolts, pins, handle screws, hand knob screws, or any other suitable fastener. When the fastener 16 is inserted or installed in or through an aperture 148a or weld nut 152 of the vertical mount cap 148, the fastener presses against or otherwise makes frictional contact with the flag pole 18 so that the flag pole is secured in a fixed position within the interior space formed between the mount head 150 and the vertical mount cap. In exemplary embodiments, the apertures 148a of the vertical mount cap 148 include weld nuts 152 into which hand knob screws or handle screws 16 are insertable by screwing to press into the flag pole 18 installed inside the interior space.

Figure 17:
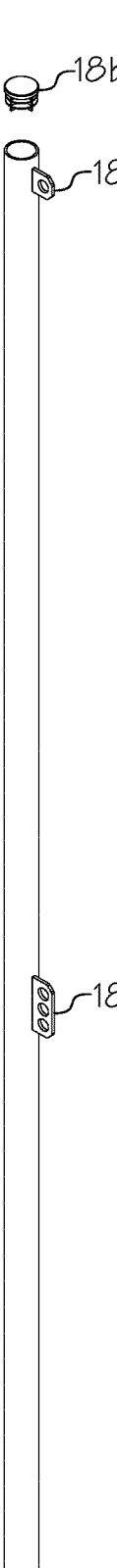
FIG. 17 is a perspective view of the flag pole of FIG. 7.

As shown in FIG. 17, the flag pole 18 is a flag pole having at least two attachment means 18a for attaching a flag thereto. In one embodiment, the at least two attachment means 18a are upper and lower flanges, with each flange having at least one aperture for receiving a ring, clip, or other fastener to attach the flag to the flanges. The flag pole may 18 include a removable cap 18b or plug that is useful for covering a top opening of the flag pole in embodiments in which the flag pole is constructed using a hollow tube. The flag pole 18 is cylindrical or any other suitable shape, and may be hollow or solid.

The invention also relates to a system that includes the flag pole mounting device 100 and the flag pole 18. The invention also relates to methods for connecting a flag pole 18 to a vehicle using the flag pole mounting device as described herein in its various embodiments.

Flag Mount Device for Trailer Stake Pocket

The invention also relates to a flag pole mounting device for installation of a flag pole in a trailer stake pocket present on the side of a trailer. This mounting device includes an upright plate, a mount head that connects to the upright plate, and a cap plate that is connectable to the upright plate.

The upright plate includes an upper portion and a lower portion. The lower portion of the upright plate includes a front side wall and left and right side walls. The left and right side walls extend generally perpendicularly off the left and right sides of the front side wall to form a vertically oriented channel between them. The channel is generally rectangular in cross-sectional shape in exemplary embodiments but may have other cross-sectional shapes in other embodiments. The left and right side walls have bottom ends that are coterminous with a bottom end of the front side wall. The left and right side walls have top ends that terminate parallel to one another where the lower portion ends and the upper portion begins to extend upward. The lower portion is shaped and sized so as to be insertable within a trailer stake pocket on a trailer. By inserting the lower portion of the upright plate within the trailer stake pocket of the trailer, the flag pole mounting device is securely but removably connected to the trailer.

In some embodiments of the flag pole mounting device, the left and right side walls of the lower portion each include one or more pin-receiving apertures. For example, the left side wall and the right side wall of the lower portion may each include one, two, three, four, five, or more pin-receiving apertures. The pin-receiving apertures are positioned vertically on each of the left and right side walls. The pin-receiving apertures of the left side wall are positioned at a height or heights that correspond to a height or heights of the pin-receiving apertures of the right side wall. The pin-receiving apertures are sized and shaped to receive a pin that locks the lower portion of the upright plate within the trailer stake pocket of the trailer. The pin is a bent pin (also known as a hitch pin and a bent hitch pin) or any other suitable pin. Where the trailer stake pocket includes one or more apertures, the lower portion of the upright plate is adjustable by manual movement so that the pin-receiving apertures align with the one or more apertures of the trailer stake pocket. The pin is insertable through the apertures of the trailer pocket, which it passes through to then insert through the aligned pin-receiving apertures of the left and right side walls of the lower portion.

In some embodiments, the flag pole mounting device includes both a pin and a connectable bridge pin for securing the pin in a fixed or locked position after insertion through the apertures of the trailer stake pocket and the pin-receiving apertures of the lower portion of the upright plate. In such embodiments, the pin includes an aperture extending through one end for receiving the bridge pin.

The upper portion of the upright plate is a shaped as a plate that is a vertical extension of the front side wall of the lower portion and extends vertically upward therefrom. The upper portion includes two or more apertures for receiving fasteners. In some embodiments, the apertures may each have weld nuts installed in them for receiving handle screws, hand knob screws, or other fasteners.

The cap plate is a horizontally oriented plate that includes an aperture extending vertically therethrough. The top end of the upper portion is insertable through the aperture of the cap plate. The cap plate is movable downward over the upper portion of the upright plate until a bottom side of the cap plate rests upon the top ends of the left and right side walls of the lower portion of the upright plate.

The mount head includes three side walls forming a channel therebetween. The channel is generally U-shaped in exemplary embodiments but may have over cross-sectional shapes in other embodiments such as, for example, rectangular, trapezoidal, or semicircular. The mount head is vertically oriented when connected to the upright plate. When the mount head is connected to the upright plate, the channel of the mount head is enclosed by the upright plate thereby forming an interior space between them. The flag pole is insertable into this interior space. In some embodiments, when inserted into the interior space, the flag pole rests upon a top side of the cap plate, which forms a bottom wall enclosing a bottom end of the interior space formed between the mount head and the upright plate.

Fasteners are inserted through each of the apertures of the upper portion of the upright plate or weld nuts. Examples of fasteners that may be used include screws, bolts, pins, handle screws, hand knob screws, or any other suitable fastener. When the fastener is inserted or installed in or through an aperture or weld nut of the upper portion of the upright plate, the fastener presses against or otherwise makes frictional contact with the flag pole so that the flag pole is secured in a fixed position within the interior space formed between the upper portion of the upright plate and the mount head. In exemplary embodiments, the apertures of the upper portion of the upright plate include weld nuts into which hand knob screws or handle screws are insertable by screwing to press into the flag pole installed inside the interior space.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for attaching a flag pole to a vehicle, the system comprising:
   a lower attachment device for connecting to a trailer hitch; wherein the lower attachment device comprises:
      a lower wedge lock comprising a side wall, a top end, and a bottom end, wherein the bottom end of the lower wedge lock is removably connectable to the trailer hitch; and
      a center bolt that is connected to and extends vertically above and from a center of the top end of the lower wedge lock; and
   an upper attachment device for connecting to the lower attachment device and for receiving and holding the flag pole.

2. The system of claim 1, wherein the top end of the lower wedge lock comprises a shape that is elliptical in a diagonal plane and wherein the bottom end is generally flat.

3. The system of claim 2, wherein the upper attachment device comprises an upper wedge lock comprising a side wall, a top end, and a bottom end; wherein the top end of the upper wedge lock is generally flat and wherein the bottom end comprises a shape that is elliptical in a diagonal plane.

4. The system of claim 3, wherein the shapes of the top end of the lower wedge lock and the bottom end of the upper wedge lock are complementary so as to be alignable with and connectable to one another; wherein once connected, the upper wedge lock and lower wedge lock form a unitary cylindrical body.

5. The system of claim 4, wherein the upper and lower wedge locks are connectable together by twisting to lock them together to prevent the system from being removed or detached from the trailer hitch during usage of the system for attaching the flag pole to the vehicle.

6. The system of claim 1, wherein the upper attachment device comprises:
   an upper wedge lock comprising a side wall, a top end, and a bottom end;
   a plate comprising an upper side and a lower side, wherein the plate covers the top end of the upper wedge lock;
   a gusset connected to the upper side of the plate;
   a vertical mount cap that connects to the upper side of the plate; and
   a mount head that is connectable to the vertical mount cap.

7. The system of claim 6, wherein the plate comprises:
   a first aperture that passes vertically through the plate for receiving a bottom end of the gusset; and
   a second aperture that passes vertically through the plate for receiving a bottom end of the vertical mount cap.

8. The system of claim 6, wherein the gusset is oriented vertically when installed and provides strength and stability to the mount head when the mount head is attached to the vertical mount cap.

9. The system of claim 6, wherein the vertical mount cap is plate-shaped and is vertically oriented when connected to the plate and to the mount head.

10. The system of claim 6, wherein the vertical mount cap comprises two or more apertures for receiving handle screws, hand knob screws, or other fasteners.

11. The system of claim 6, wherein the mount head comprises three side walls forming a channel therebetween; wherein the channel is generally U-shaped, rectangular, trapezoidal, or semicircular; and wherein the mount head is vertically oriented when connected to the vertical mount cap.

12. The system of claim 6, wherein when the mount head is connected to the vertical mount cap, the channel of the mount head is enclosed by the vertical mount cap thereby forming an interior space between the mount head and the vertical mount cap; and wherein the flag pole is insertable into the interior space.

* * * * *